Sept. 20, 1955  F. T. WALLIN  2,718,225
NECK SEAL FOR RESPIRATORS
Filed March 21, 1950
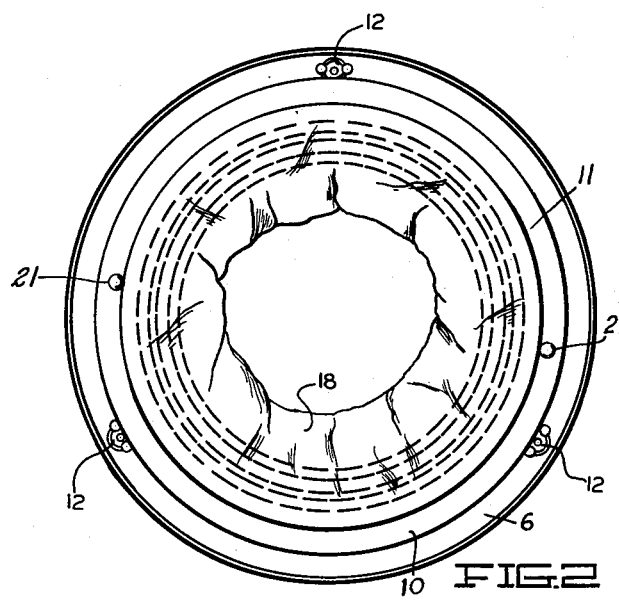
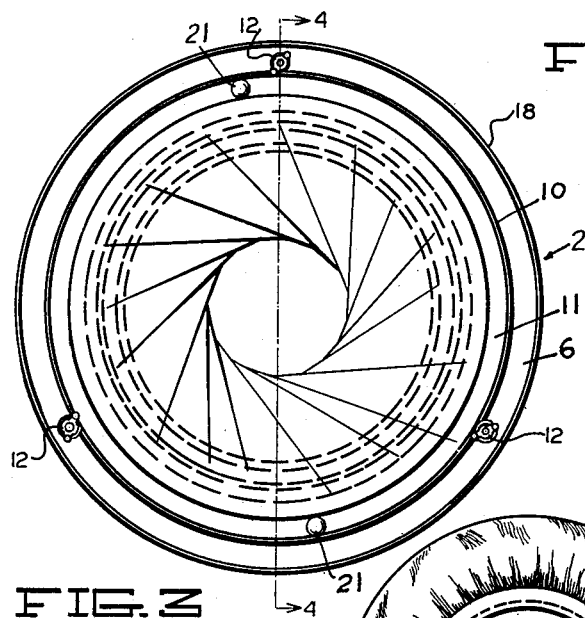
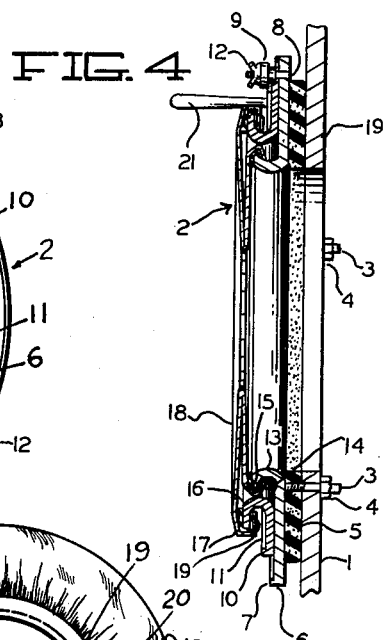
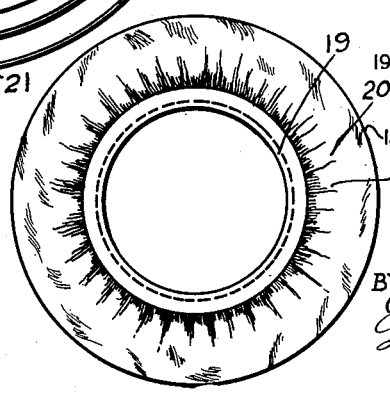
INVENTOR.
FRANCIS T. WALLIN
BY
Ezekiel Wolf
his attorney United States Patent Office 2,718,225
Patented Sept. 20, 1955

2,718,225

NECK SEAL FOR RESPIRATORS

Francis T. Wallin, Brookline, Mass.

Application March 21, 1950, Serial No. 150,919

6 Claims. (Cl. 128—30)

The present invention relates to an improvement over the applicant's prior Patent No. 2,478,852, which is the first type of so called spiral lock seal for a patient's neck in an artificial respirator.

The present invention relates to a cheaper type of pleated neck seal which can be readily replaced on the respirator. While the present invention is not as durable and lasting as that described in the original patent, there is an advantage to be derived from its lightness and replaceability as well as from its lower cost.

In the present type of neck seal, there is provided a collar similar to that described in my prior patent and the general method of tightening the collar about the neck is also similar to that in my prior patent. In construction however the arrangement differs materially as will be readily seen from the description in the specification set forth below when taken in connection with the drawings, in which:

Figure 1 shows a side elevation of the neck seal of the present invention.

Figure 2 shows a front elevation as viewed from the left of Figure 1.

Figure 3 shows a front elevation in the same relation as in Figure 2 but with the collar in a more tightened position.

Figure 4 shows a section through the complete collar and a portion of the head end of the respirator on the line 4—4 of Figure 3, and, Figure 5 shows the flexible collar element alone, removed from the collar frame, viewed looking into the opening at one end.

Referring particularly to Figure 4, the head plate or end of the respirator is shown at 1. The collar assembly 2 is hermetically sealed to the head opening or end 1 of the respirator by means of bolts and nuts 3 and 4 which clamps the collar assembly to the head end of the respirator with a sponge rubber sealing gasket 5 intervening between the two elements. The collar assembly itself comprises a ring plate 6 which faces the sealing gasket 5 and from which the bolts 3 extend to clamp the respirator. The ring plate 6 is formed with an edge rib or bead 7 extending about the periphery of the ring plate facing away from the respirator. On this ring plate just within the bead or rib 7 are mounted three threaded stud elements 8 over which fits a bushing 9 clamping against the edge or bead 10 of an outer ring plate 11 by means of a wing nut 12. While the drawing shows only three stud bushings and wing nuts, one at the top and two at the sides of the collar, more may be used if desired. The outer ring plate 11 and the inner ring plate 6 are in their normal used position coaxial and substantially concentric one with the other. The inner and larger ring plate 6, has at its inner edge an outwardly turned groove section 13 which borders the circular opening in the ring plate 6 which is clamped in a fixed position against the respirator. The outer turned edge of the groove section 13 is covered by a collar 14 of rubber or other similar material which is preferably cemented to the bead or rim edge 15 of the end of the grooved section. While rubber, neoprene or a plastic element may be used, it is preferable to have some soft yielding material which also provides a friction surface.

The outer ring plate 11 which lies in face contact with the inner ring plate 6, has a similarly outwardly turned or grooved or elbowed section 16 similar to the section 13 but lying outside of the grooved or elbow section 13 and therefore the inner diameter of the elbowed section 16 is slightly larger than that of the section 13. The end of the elbow section 16 is similarly capped by a cover element 17 which is preferably of the same construction and material as that of the cover element 14. In adjusting the collar to fit the neck of the patient, the outer ring 11 is rotated with the inner ring 6 remaining fixed in position.

Attached over the cover element 14 on the inner edge of the groove or elbow 13, is a soft pliable, flexible and yieldable plastic collar element 18. This may be made out of Vinylite sheeting or other similar soft, flexible fabric or plastic member or membrane. The collar element 18 is bound at each end by an elastic web 19, which normally when off the collar frame may be considerably smaller than the normal neck opening of the ring as shown in Figure 5. The elastic band or web 19 to which the collar element 18 is cemented or sewed, is attached in such a way that uniform pleats 20, 20, etc., are normally formed in the material of the collar element 18 when the collar element is off the collar frame. The collar element 18 may have a normally larger diameter than the head opening at either end of the collar frame and therefore when the collar element is off, the frame will appear somewhat like a Japanese lantern with both ends open. The collar element 18 is mounted on the elbow elements or grooves by snapping one elastic band or web 19 over one of the elbow rings and snapping the other elastic band or web 19 over the other elbow rim of the respective ring plates.

If desired the diameter of the collar 18 may be just large enough to snap on the turned rim edges but a larger diameter is preferable since the elastic band 19 effectively holds the ends of the collar elements well in the groove or elbow in the ring plates.

A further advantage of having a larger diameter for the collar element than that of the rings, is that a greater variation in neck size can be accommodated with the same length of collar or tube element.

In the operation of the device, the patient is put into the respirator with his head passed through the head opening. The outer ring 11 is then turned by means of the hand knobs 21 as the tube or collar element 18 begins to pleat or fold itself, first as shown in Figure 2, and then as a smaller neck size is obtained as shown in Figure 3.

It is possible by having a sufficiently long tube or tube of sufficiently large enough diameter, to close entirely the neck opening so that any size of neck may be accommodated from the largest which the respirator can take to the smallest infant's size.

When the outer collar has been turned up to the desired tightness, the wing nuts 12 are tightened and the outer ring thereby is clamped in its desired position.

The plastic tube may be extruded as a collar without pleating or it may be formed with a sheet cemented or sewed together longitudinally along its length. The tube need not be uniform, but may be larger on one end than at the other. Where the groove or the outer ring is larger than that of the inner ring, the tube may be tapered to a larger dimension at the outer ring plate. However as has been previously mentioned, the diameter of the tube element or collar element 18 may be considerably larger than that of either of the ring openings in which case a greater range of neck size may be accommodated.

Having now described my invention, I claim:

1. For use in a respirator, a neck seal comprising a ring plate for fixed connection to the head plate in said respirator providing a neck opening, said ring plate being constructed to be sealed to the neck opening in the respirator, having an outwardly turned neck section, a second ring plate having means mounting it to be turned coaxially with the first ring plate and also having an outwardly turned neck section, a flexible, yielding, pliable, thin tubular element gathered at each end by an elastic band element and constructed to fit snugly over the coaxial ends of the ring plates, the normal opening of the gathered ends of the tubular element being smaller than the outwardly turned neck section of the ring plates whereby the ends of the tubular element may be slipped over the turned neck section.

2. For use in a respirator, a neck seal comprising a ring plate for fixed connection to the head plate in said respirator providing a neck opening, said ring plate being constructed to be sealed to the neck opening in the respirator, having an outwardly turned elbowed neck section on the inside opening of the ring, a second ring plate having means mounting it to be turned coaxially with the first ring plate and also having an outwardly turned elbowed neck section on the inside opening of the ring, a flexible, yielding, pliable, thin tubular element gathered at each end by an elastic band element and constructed to fit snugly over the coaxial ends of the ring plates, the normal opening of the gathered ends of the tubular element being smaller than the elbowed neck section of the ring plates whereby the ends of the tubular element may be slipped over the elbowed neck section.

3. For use in a respirator, a neck seal comprising a ring plate for fixed connection to the head plate in said respirator providing a neck opening, said ring plate being constructed to be sealed to the neck opening in the respirator, having an outwardly turned neck section, a second ring plate having means mounting it to be turned coaxially with the first ring plate and also having an outwardly turned neck section, a rubber-like cover element covering the edge of said turned neck section providing a friction surface, a flexible, yielding, pliable, thin tubular element gathered at each end by an elastic band element, the normal opening of the gathered ends of the tubular element being smaller than the outwardly turned neck section, said elastic bands being slipped over said rubber-like cover elements on said neck sections whereby said tubular element becomes firmly attached to said ring plates.

4. For use in a respirator, a neck seal comprising a ring plate for fixed connection to the head plate in said respirator providing a neck opening, said ring plate being constructed to be sealed to the neck opening in the respirator, having an outwardly turned neck section, a second ring plate having means mounting it to be turned coaxially with the first ring plate and also having an outwardly turned neck section larger than the first neck section, a flexible, yielding, pliable, thin tubular element gathered at each end by an elastic band element and constructed to fit snugly over the coaxial ends of the ring plates, the normal opening of the gathered ends of the tubular element being smaller than the outwardly turned neck section of the ring plates whereby the ends of the tubular element may be slipped over the turned neck section.

5. For use in a respirator, a neck seal comprising a ring plate for fixed connection to the head plate in said respirator providing a neck opening, said ring plate being constructed to be sealed to the neck opening in the respirator, having an outwardly turned neck section, a second ring plate having means mounting it to be turned coaxially with the first ring plate and also having an outwardly turned neck section, a flexible, yielding, pliable, thin tubular element gathered at each end by an elastic band element and constructed to fit snugly over the coaxial ends of the ring plates, the normal opening of the gathered ends of the tubular element being smaller than the outwardly turned neck section of the ring plates whereby the ends of the tubular element may be slipped over the turned neck section and means for fastening said second ring to said first ring when the former has been turned up to tightened position.

6. For use in a respirator, a neck seal comprising a ring plate for fixed connection to the head plate in said respirator providing a neck opening, said ring plate being constructed to be sealed to the neck opening in the respirator, having an outwardly turned neck section, a second ring plate having means mounting it to be turned coaxially with the first ring plate and also having an outwardly turned neck section, a flexible, yielding, pliable, thin tubular element gathered at each end by an elastic band element and constructed to fit snugly over the coaxial ends of the ring plates, the normal opening of the gathered ends of the tubular element being smaller than the outwardly turned neck section of the ring plates whereby the ends of the tubular element may be slipped over the turned neck section, a plurality of bushings mounted on said first ring plate beyond the second ring plate having collars adapted to ride over the edge of said second ring plate and means for clamping said collars down on the edge of said second ring plate.

References Cited in the file of this patent

UNITED STATES PATENTS

| | | |
|---|---|---|
| 1,906,844 | Drinker | May 2, 1933 |
| 2,405,682 | Bogoslowsky | Aug. 13, 1946 |
| 2,410,786 | Mallory | Nov. 5, 1946 |
| 2,478,852 | Wallin | Aug. 9, 1949 |
| 2,695,605 | Gibbon | Nov. 30, 1954 |